Patented Aug. 8, 1950

2,517,737

UNITED STATES PATENT OFFICE 2,517,737

STABILIZED DISPERSIONS AND SHAPED ARTICLES MADE THEREFROM

Pierce M. Travis, Ridgewood, N. J., assignor of one-fourth to J. D. Silverman and one-fourth to Morris Hirsch, both of New York, N. Y.

No Drawing. Original application July 25, 1940, Serial No. 347,479. Divided and this application June 7, 1946, Serial No. 675,292

5 Claims. (Cl. 260—815)

The present invention while more especially concerned with the art of dipped latex goods is of more general application to various natural or artificial rubbers, whether the product is fabricated by dipping or otherwise.

It is an object of the invention to provide a dispersion of latex so thoroughly stabilized as to entail no premature coagulation or separation into distinct layers, even though the suspension be allowed to remain without agitation in a vessel unused for several days, and in which the agent that brings about such stabilization in nowise interferes with the various processing steps in fabrication of the product or in anywise impairs the quality or appearance of the resulting product, but, on the contrary, effects improvements, among which are increase in the speed of vulcanization, with the use of a lesser amount of vulcanizing agent for any given result.

Another object is to provide latex goods, the progressive deterioration of which due to the presence therein of excess vulcanizing agent, is greatly reduced, so that the goods have longer life, and in which there is an absence of odoriferous ingredients or products.

Another object is to provide latex goods incorporating in its structure solid particles of colloidal form, so uniformly and thoroughly distributed within the finished product as materially to enhance its life under severe conditions of use.

The present application is a division of my parent case, Serial No. 347,479 filed July 25, 1940 on which Patent No. 2,404,008 was issued on July 16, 1946.

The latex bath of the present invention is maintained properly dispersed in its aqueous solution by a small proportion of water soluble dispersing or surface tension lowering agent. This agent must of course be effective in the alkaline solution in which the latex is usually maintained in dispersion. Among various water soluble dispersion agents, phosphates and silicates of various alkali metals are suitable and among such specific chemicals are alkali metal silicates such as sodium silicate and phosphates such as those of sodium and potassium.

The latex suspension preferably includes as the stabilizing agent an extract of Irish moss which is a reddish edible alga (*Chondrus crispus*) in bleached condition. The Irish moss extract includes the carbohydrate ($C_{12}H_{20}O_{10}$) as well as nitrogen containing and sulphur containing compounds. The stabilizing agent even when used in quantities but a small fraction of those required with previously known stabilizing agents renders the dispersion thoroughly stable for days. Accordingly, a dipping tank may be used devoid of stirring devices or agitators, and the latex yet remains thoroughly dispersed without separation into layers of different consistencies, and no straining equipment is required for removal of rubber coagulant. In fact, the residue in the dipping tanks after a day's operation may be returned to storage without disturbance or waste. By reason of the small amount of stabilizing agent used accordingly to the present invention, deleterious action upon the product is avoided, and the product is further improved, because with the stabilizing agent of the present invention, a considerable reduction in the amount of vulcanizing agent and increase in the speed of vulcanization are effected for any given result.

I do not know which one or ones of the ingredients of the Irish moss extract are responsible for the result accomplished. The advantageous results accomplished may of course be attained if active ingredients substantially the same or equivalent to those present in such extract of Irish moss are derived from other sources. The term "extract of Irish moss" as used in the claims is intended to embrace the active ingredients of the extract or the equivalent thereof, regardless of the source from which the same may be derived.

In use of the invention complementary reagents, respectively in the coagulant carrying coating on the form and in the latex dispersion, will upon the dipping of the coated form react within the latex as it coagulates upon the form, to produce the finely divided precipitate in colloidal state by which the strength of the product is enhanced. This result may be attained for instance by the reaction of a salt in aqueous solution within the latex upon a salt in aqueous solution within the solid gel coating upon the form. Among the salts useful for the purpose in the latex dispersion are soluble phosphate, carbonate or silicate, say of sodium and potassium. Among salts suitable for the purpose in the coating gel are calcium, magnesium, zinc, aluminum and iron chloride, nitrate and acetate. Obviously the salts may be interchanged, i. e. those specified as dissolved in the coating gel may be placed in the latex and vice versa.

The coagulating agent in the coating on the form and the dispersing agent in the latex dispersion may however themselves be utilized as the reagents that produce the colloidal precipitate in the latex film. Thus, coagulating agent on the form such for instance as calcium chloride, may be utilized to react in the course of the dipping process with sodium phosphate, for instance, used as the dispersing agent in the latex, thereby to produce a colloidal precipitate of calcium phosphate within the latex as the latter is being coagulated.

The latex bath according to the present invention has the advantages above set forth including thorough stability as well as economy in the use of vulcanizing material for a given result, even though used in processes previously known for forming latex products. However the improved solid gel coating carrying the coagulating agent on the form according to one aspect of the invention when used in combination with the stabilized latex according to another aspect of the invention, results not only in the additive advantages of each of these features, but in the further advantage above pointed out, that the coagulating agent in the coating on the form reacts with the water soluble dispersing agent in the latex bath to produce the colloidal precipitate in the latex film as it is being coagulated, with the resultant strengthening and improvement in the quality of the product.

In carrying out the preferred process, the form is first dipped in the gel solution of locust bean gum and rubber coagulant such as calcium chloride and is thereupon dipped in the dilute solution containing a borate radical thereby to set or solidify the gel, which feels dry to the touch upon the form. The form is then dipped into the latex dispersion of the present invention for a period of time depending upon the thickness of product desired. In this action, the rubber coagulant from the gel readily reaches the stabilized latex, which it causes promptly to coagulate as a film upon the form, with the resultant formation of colloidal precipitate within such latex film. After removal from the latex bath, the product is vulcanized upon the form, washed, and removed therefrom. The form is thereupon washed to remove the gel coating and the foregoing cycle is repeated. Preferably a continuous conveyor system is used to make the product, in which each form passes through the cycle which includes coating, dipping, vulcanizing, washing the vulcanized product, removing it, and washing the form.

While the method, compositions and product are above set forth in general terms, there follows, in literal compliance with the requirements of the patent statutes, a specific detailed account of one practical manner of carrying out the invention in practice.

Making stabilized latex

Rubber latex is used in undiluted form containing say, 30 to 35 parts of rubber for 100 parts of the latex, proportions here and elsewhere herein being expressed as parts by weight. Preferably, however, I use concentrated latex containing about 60 per cent of rubber.

To the latex there is added a small proportion of water-soluble dispersing agent, desirably say about 0.2 to 0.8 part for 100 parts of rubber in the latex. Thus, there may be added one of the sodium phosphates described, the corresponding potassium salt, an alkali metal silicate or other conventional dispersing agent for latex, provided the dispersing agent is alkaline or is effective in the presence of ammonia or other alkali.

To the latex and dispersing agent dissolved therein a colloidal material extracted from Irish moss is admixed as the stabilizing agent. The extracted stabilizing agent may be added to the latex in various proportions. For most purposes I use 0.005 to 0.025 part of the stabilizing agent on the dry basis for 100 parts of rubber in the latex. Smaller proportions of the agent may be used if there is no objection to a decrease in the stability of the latex or to a decrease in the effect of the added extract on the rate of subsequent vulcanization of the latex. Likewise, a larger proportion than 0.025 part may be used. Such larger proportion is ordinarily unnecessary and, consequently is not justified economically.

To make the extract, Irish moss is digested with boiling water. The resulting mixture is filtered to remove stems and other impurities. The filtered gel or extract is then dehydrated. For this purpose, the gelatinous material that is to be used as a stabilizer is precipitated by adding a soluble alcohol to the filtered extract. Thus, there may be used ethyl, isopropyl, or tertiary butyl alcohol, the selected alcohol being stirred into the aqueous composition until the proportion of the added alcohol is such as to convert the desired colloidal extracted material to a precipitate. A mixture of liquids that gives good precipitation is one containing approximately as much added alcohol as there is water present. The precipitated extract is separated from the liquid, first by draining and then by drying at a moderately elevated temperature. The dry product so obtained is a reversible colloid having the property of taking up many times its weight of water in returning to the form of a gel. As is evident from the method of preparation, the product is water-dispersible and alcohol-precipitable. An extract which is suitable and available commercially is commonly known as "gelloid."

The effectiveness of the Irish moss extract in stabilizing may be judged from a small proportion of it required to give non-coagulating and non-creaming dispersions. Whereas the proportion of it necessary is of the order of hundredths of one percent, the common stabilizer casein is ordinarily used in amounts up to about one-half to one percent of the weight of rubber in the latex. With the much smaller proportion in the case of the gelloid, there is a minimum of interference of the stabilizer with the properties of the finished rubber.

Vulcanizing material

As the vulcanizing material, there are used conventional mixtures including, for instance, vulcanization agents and accelerators.

A difference from common practice arises in that it is possible, with the extract of Irish moss present as stabilizer, to decrease the proportion of vulcanizing material for a given cure under standard conditions of time and temperature of curing and at the same time to increase the speed of vulcanization. Thus, I have found it possible and desirable to decrease the proportions of sulphur, zinc oxide, and accelerator to about one-half to three-fourths of the proportions conventionally used. At the same time, I cure my composition usually at a final temperature not substantially above 100° C. and for a period of time of about 35 minutes or so, 20 minutes at 85° C. followed by 15 minutes at 100° C. being suitable.

The vulcanization material is ordinarily mixed in a ball mill or the like. Thus, I have made such a material by ball milling the following ingredients to 5 microns or less, in the proportions shown:

| Vulcanizing material: | Parts |
|---|---|
| Sulfur predominantly of size of particles initially of about 15 to 25 microns | 7.6 |
| Zinc oxide of average particle size about 0.12 micron | 3.9 |
| Gelloid containing about 0.25% of gel on the dry basis | 7.6 |
| Wetting agent | 0.03 |
| Water to make | 100 |

The kind and proportion of the wetting agent used and of the other ingredients of the composition may be varied, according to the effect desired in the product. As the wetting agent there may be used, for example, cyclohexanol, a sulfonated higher aliphatic alcohol, or alkyl sulfates, the compounds of the latter two classes being used in the form of their sodium salts or potassium salts.

During the milling, the presence of the extract of gelloid which may, if desirable be Irish moss, minimizes reagglomeration of particles dispersed by the milling.

Accelerator

As the accelerator there is used one of the commercial accelerators of rubber vulcanization, care being taken that the activity of the accelerator, the proportion used, or the conditions of subsequent vulcanization are not such as to cause overcuring. As the accelerator, I use to advantage piperidine penta-methylene dithiocarbonate, which is sometimes known as "Du Pont 552" or as "pip-pip." A suitable proportion of this accelerator is 0.5 part to 100 parts of rubber content of the latex. The proportion of the accelerator may be varied somewhat, particularly as more or less severe conditions of vulcanization are to be employed. Also, other conventional accelerators may be substituted in amounts to give about the same acceleration as that obtained with the pip-pip.

Making latex bath

The stabilized latex, vulcanizing material, and accelerator are made into a composition such as the following for application to the forms:

| | Parts |
|---|---|
| Rubber in form of 60% latex | 100 |
| Trisodium phosphate, on the dry basis | 0.4 |
| Irish moss extract of concentration 0.25% | 0.025 |
| Vulcanizing material of type given above | 10 |
| Additional zinc oxide | 0.05 |
| Accelerator (pip-pip dissolved in 12 parts of water), dry basis | 0.5 |
| Dispersed "Antox" as antioxidant | 0.5 |
| Ammonia | To make alkaline |

The order of mixing that has been used is the addition of the antioxidant, say a butyraldehyde-aniline derivative, to the stabilized latex, the accelerator and the vulcanizing material being then added in turn.

The vulcanizing material suitably contains about 1.3 parts of sulfur and 0.65 part of zinc oxide for 100 parts of rubber. These proportions are substantially less than would be required for a given cure if the Irish moss extract were absent.

The proportion of ammonia used is suitably such as to make the pH about 11 to 11.5.

Coating on forms

The forms to which are to be applied the rubber composition, to form shaped articles of rubber, are first given a special coating.

The coating is dry to the touch, non-flowable and preferably is a solid gel including coagulant for the rubber in the said composition. For best results, the coating includes also a compound adapted to react with a chemical dissolved in the rubber composition, to precipitate a colloidal strengthening agent; as the rubber is coagulated on the coated form, there is thus produced the colloidal strengthening agent in substantially uniform distribution throughout the coagulated rubber. For most purposes, the rubber coagulant and the compound in the coating of the forms for precipitating the strengthening agent may be the same material.

Particularly good results have been obtained when the coating composition on the forms contains locust bean gum, frequently known as "Carob gum." Such gum on the form is set so that it is non-flowable at the time of dipping. Furthermore, the gum is made to hold within its gel a dispersed aqueous solution of a rubber coagulating agent and advantageously a precipitating compound is described. As a coated form is dipped into the latex composition, for example, the diffusion of the coagulant to the surface of the coating, as the rubber is coagulated, causes the formation of a layer of rubber of satisfactory thickness over the form.

A typical example of the coating of the form to be dipped is the following. There is made a warm solution or dispersion containing locust bean gum and, as the rubber coagulant, a soluble salt of a multivalent metal, as, for example an alkali earth metal. Particularly good results have been obtained by the use of calcium chloride or calcium nitrate. Thus, there is made a solution of calcium chloride dihydrate in the proportion of 2.5 parts for 100 parts of the solution. The proportion of the locust bean gum is suitably about 1 to 2 parts for 100 of the solution. With less of the locust bean gum used, the resulting gel may be too thin, whereas more of the gum involves unnecessary expense and may give a dispersion too thick for smooth coating of the forms. Gels of 1.3 to 1.6% gum are especially satisfactory.

The forms are dipped into the solution or dispersion at about 45 to 60° C. and the coated forms caused to cool, as by standing in air. On cooling, the gel stiffens.

The gel coating is then treated with a solution of a setting agent such as a borate compound, as, for example boric acid and/or alkali metal borate, suitably borax in dilute aqueous solution. For quick setting of the gel, there has been used to advantage an aqueous solution containing 1% of mixed borax and boric acid in the proportion of 70 parts of borax for 30 parts of boric acid, and showing a pH of about 8.2. In general, the borate solution is most effective as setting agent for the locust bean gum when the pH is established, by the addition of an acid, at about 7 to 9. There is thus formed a transparent, non-flowable gel that is flexible and very durable under the conditions of use.

Making shaped rubber articles

To the forms coated as described there is applied an aqueous dispersion of rubber-like material such as one of the compositions tabulated above. The application may be made by spraying, dipping, or other equivalent conventional method, the invention being described particularly by reference to the dipping method for forming shaped articles.

With the use of a dipping composition including dissolved phosphate or like dispersing agent, the electrolyte (salt of a multivalent metal) in the locust bean gum coating on the form causes coagulation of rubber at the surface of the coating and also causes simultaneously the precipitation of an insoluble colloid including an ingredient (ordinarily the acid radical) of the dispersing agent. This precipitate remains dispersed in colloidal state in the rubber. When the coagulant is a calcium salt, the dispersed precipitate is a calcium salt. The effect of such material is a strengthening of the finished shaped articles.

In a short interval, there may be built up by this process an article of satisfactory wall thickness. In making most articles, it is not necessary to resort to repeated or even to a second dipping. In many cases, one dipping for one minute is adequate.

To cause still more rapid deposition of rubber on the form, the ammonia in the dipping composition may be neutralized immediately before the forms are dipped. In this manner the pH value is reduced nearly to the isoelectric point, or pH value at which the rubber is very readily coagulated. Thus, the ammonia present may be largely neutralized by the addition of formaldehyde or other water-soluble aldehyde that is reactive with ammonia and the dispersion remains stable. In a typical procedure, there was used a 20% solution of formaldehyde in water, the pH being thereby lowered to 9.

The rubber thereupon shaped around the forms is subjected to curing at a temperature that is suitably not substantially above 100° C. and for a time of about 40 minutes. Thereupon the product is washed in water to remove water soluble material. The product is uniform in quality and light in color.

The cured article is then stripped from the form. The form is then freed from remaining coating material, preferably by washing in water and is recoated before reuse.

As the rubber dispersion to be used, the aqueous dispersion of latex is particularly satisfactory. For the latex however, there may be substituted an artificially made water dispersion of rubber or synthetic rubber, all of which are embraced in the term "rubber" as used in the claims. Such substitutions are made part for part on the dry basis.

My stabilized latex may be used for other purposes than to form rubber articles by dipping. Thus, the stabilized latex may be substituted for conventional latex in substantially all uses for conventional latex including the impregnation and coating of fabrics and cords.

The details that have been given are for the purpose of illustration, not restriction. Variations within the spirit of the invention are intended to be included within the scope of the appended claims.

What I claim is:

1. An aqueous dispersion comprising rubber latex at a pH above 7, a water-soluble dispersing agent for rubber particles of the latex that is effective at a pH above 7, and selected from the group consisting of alkali metal phosphate, carbonate and silicate and a colloidal water-dispersible and alcohol-precipitable extract of Irish moss, serving in the absence of other stabilizer to stabilize the dispersion and decreasing the proportion of vulcanizing material required for a given cure.

2. An aqueous dispersion comprising rubber latex, an alkali metal phosphate serving as dispersing agent for rubber particles of the latex and a colloidal water-dispersible and alcohol-precipitable extract of Irish moss, the dispersing agent increasing the thoroughness of the dispersion and the said extract, serving in the absence of other stabilizer to stabilize the dispersion and decreasing the proportion of vulcanizing material required for a given cure.

3. The dispersion described in claim 1, the latex being in substantially undiluted condition and the dispersing agent being a phosphate present in proportion adequate to improve the dispersion but not substantially in excess of 0.8 part for 100 parts of rubber.

4. The dispersion described in claim 1, the colloidal extract of Irish moss being present in the proportion of approximately 0.005 to 0.025 part for 100 parts of rubber in the dispersion and the pH of the dispersion being above 7.

5. The method of forming a stable dispersion of rubber-like material which comprises mixing a water-soluble dispersing agent for rubber particles and selected from the group consisting of alkali metal phosphate, carbonate and silicate a colloidal alcohol precipitate extract of Irish moss into an aqueous dispersion of the rubber-like material which is stable in the absence of other stabilizer.

PIERCE M. TRAVIS.

REFERENCES CITED

The following references are of record in the file of this patent:

UNITED STATES PATENTS

| Number | Name | Date |
|---|---|---|
| 1,647,805 | McGavack | Nov. 1, 1927 |
| 1,754,842 | Traube | Apr. 15, 1930 |
| 1,783,057 | Schuster et al. | Nov. 25, 1930 |
| 2,041,712 | Hiers | May 26, 1936 |
| 2,161,455 | Clifford | June 6, 1939 |
| 2,203,866 | Gibbons et al. | June 11, 1940 |
| 2,337,562 | Lund | Dec. 28, 1943 |
| 2,404,008 | Travis | July 16, 1946 |

FOREIGN PATENTS

| Number | Country | Date |
|---|---|---|
| 449,428 | Great Britain | June 26, 1936 |